US009673598B2

(12) United States Patent
DeBartolo, Jr. et al.

(10) Patent No.: US 9,673,598 B2
(45) Date of Patent: Jun. 6, 2017

(54) COVER ASSEMBLY FOR AN ELECTRICAL BOX

(71) Applicant: Hubbell Incorporated, Shelton, CT (US)

(72) Inventors: Joseph V. DeBartolo, Jr., North Stonington, CT (US); Sorin I. Mortun, Irvington, NY (US); Stephen R. Ewer, Milford, CT (US)

(73) Assignee: Hubbell Incorporated, Shelton, CT (US)

( * ) Notice: Subject to any disclaimer, the term of this patent is extended or adjusted under 35 U.S.C. 154(b) by 314 days.

(21) Appl. No.: 13/687,606

(22) Filed: Nov. 28, 2012

(65) Prior Publication Data

US 2014/0144667 A1    May 29, 2014

(51) Int. Cl.
*H02G 3/14*    (2006.01)
*H02G 3/18*    (2006.01)

(52) U.S. Cl.
CPC .............. *H02G 3/14* (2013.01); *H02G 3/185* (2013.01)

(58) Field of Classification Search
CPC   H02G 3/081; H02G 3/12; H02G 3/14; H02G 3/083; H02G 3/121; H02G 3/123; H02G 3/185; H02G 3/02; H02G 3/088; H02G 3/22; H02G 3/283; H02G 3/383; A47B 21/06; H05K 5/03; H01R 13/447; H01R 13/453; H01R 13/4532; H01R 13/4534; H01R 13/4536; H01R 13/4538
USPC ... 174/66, 67, 482, 483, 484, 485, 488, 490; 16/357; 220/3.2, 3.3, 241, 242
See application file for complete search history.

(56) References Cited

U.S. PATENT DOCUMENTS

| 2,167,489 | A | * | 7/1939 | Renga .................. A47J 37/0611 16/357 |
| 4,232,493 | A | | 11/1980 | Gray et al. |
| 5,032,690 | A | | 7/1991 | Bloom |
| 5,107,072 | A | | 4/1992 | Morgan |
| 5,361,541 | A | * | 11/1994 | Szyjkowski ............... B60J 5/00 49/465 |
| 5,393,930 | A | | 2/1995 | Wuertz |
| 5,866,845 | A | | 2/1999 | Markiewicz et al. |
| 6,265,662 | B1 | | 7/2001 | Riedy et al. |

(Continued)

*Primary Examiner* — Jenny L Wagner
*Assistant Examiner* — Michael E Moats, Jr.
(74) *Attorney, Agent, or Firm* — Dickinson Wright PLLC (57) ABSTRACT

A cover assembly for an electrical box, such as a fire-rated poke through, includes a frame defining an opening, the frame including a first frame location and a second frame location, the first frame location being substantially opposite the second frame location, a cover movable between a closed position over the opening and an open position away from the opening, the cover having a perimeter including a proximal end and a distal end, the proximal end being substantially opposite the distal end, and a hinge attaching the cover to the rear frame portion, the hinge having two substantially parallel pivot axes, at least one of which is movable towards and away from the other, one pivot axis located at the first frame location and the other pivot axis located at the proximal end of the cover. This construction provides a cover assembly for an electrical box that allows ready access to utility interfaces within the box, while preventing unwanted fluid and debris from damaging the junction box or utility interfaces below the cover assembly.

11 Claims, 11 Drawing Sheets

(56) References Cited

U.S. PATENT DOCUMENTS

| | | |
|---|---|---|
| 6,417,450 B1 | 7/2002 | Young |
| 6,495,753 B1 | 12/2002 | Goodsell et al. |
| 6,790,084 B1 | 9/2004 | Osborn, Jr. et al. |
| 6,989,488 B2 | 1/2006 | Valenziano |
| 7,064,268 B2 | 6/2006 | Dinh |
| 7,193,160 B2 | 3/2007 | Dinh |
| 7,301,100 B2 | 11/2007 | Drane et al. |
| 7,459,632 B2 * | 12/2008 | Bowman .................. 174/66 |
| 7,569,776 B2 | 8/2009 | Jolly et al. |
| 7,635,110 B2 | 12/2009 | Galasso et al. |
| 7,845,053 B2 * | 12/2010 | Marsh et al. ............. 16/357 |
| 7,847,199 B2 | 12/2010 | Drane et al. |
| 7,935,898 B2 | 5/2011 | Jolly |
| 7,989,710 B2 | 8/2011 | Hansen et al. |
| 7,989,711 B2 | 8/2011 | Jolly |
| 8,052,008 B2 | 11/2011 | Drane et al. |
| 8,063,317 B2 | 11/2011 | Bowman |
| 2007/0209820 A1 | 9/2007 | Drane et al. |
| 2008/0053697 A1 * | 3/2008 | Bowman ............... H02G 3/185 |
| | | 174/483 |
| 2010/0072198 A1 | 3/2010 | Roemer et al. |
| 2010/0163301 A1 | 7/2010 | Jolly |
| 2010/0206603 A1 * | 8/2010 | Drane ...................... 174/66 |

* cited by examiner

COVER ASSEMBLY FOR AN ELECTRICAL BOX

FIELD OF THE INVENTION

The present invention relates to a cover assembly for an electrical box, such as a recessed fire-rated poke through, typically installed in floors of commercial office buildings to facilitate access to electrical junction boxes or other utility interfaces. More particularly, the invention relates to a cover assembly for an electrical box having advantageous features including enlarged hinge links allowing a 180 degree rotation and thus a flat open position of the cover, gasketed side doors to resist contamination of the electrical outlets below the cover, and a camming action latch assembly that simplifies locking and unlocking of the cover.

BACKGROUND OF THE INVENTION

Numerous types and configurations of fire-rated poke throughs and floor utility boxes for use in commercial buildings are known. These poke throughs and boxes typically house electrical components, such as electrical receptacles, jacks, plugs and other devices. The poke throughs typically permit electrical cables to connect to the electrical components housed inside the poke through. When a poke through is positioned in the floor, it is typically provided with a cover assembly to protect the electrical components disposed within the box.

The cover assembly typically includes a cover which may be moved between an open and closed position to selectively permit access to the electrical components. The cover may be secured in the closed position to prevent it from being inadvertently opened. Typically, the cover is retained in the closed positioned by a latch that is activated through the use of a tool, such as a screwdriver. For example, the latching member may include a rotating latch which rotates between an open and closed position, thereby selectively securing and releasing the cover. Once the cover is unlatched, the tool is also typically needed to pry the cover into the open position.

Since a tool is needed to open the cover, this is inconvenient and time-consuming and requires a user to go through additional steps and secure additional equipment to simply open the cover and, for example, insert a plug in the receptacle. The tool must also be available at the time the cover is to be secured in the closed position.

In addition, poke through covers are typically designed to have relatively low profiles to avoid tripping hazards. This is especially problematic when the cover is in the open position to permit a plug to extend from an electrical component and out of the cover. Covers in the open position typically extend upwardly from the base of the cover. This creates an increased tripping hazard while the poke through is in use.

Accordingly, it would be desirable to provide an electrical box cover that may be opened and closed without the need for tools and a cover assembly that can provide access to the poke through without opening the cover.

As electrical boxes are typically located in floors, they may be exposed to water, wet mops, cleaning fluid or debris during general use. Advantageously, a cover assembly should prevent moisture infiltration, particularly into the area of the poke through that contains electrical components.

Examples of some of these prior floor boxes and fire-rated poke throughs are disclosed in the following U.S. Pat. No. 8,063,317 to Bowman, U.S. Pat. No. 8,052,008 to Drane et al., U.S. Pat. No. 7,459,632 to Bowman, U.S. Pat. No. 7,301,100 to Drane et al., U.S. Pat. No. 7,183,503 to Bowman et al., and U.S. Pat. No. 6,417,446 to Whitehead, the disclosures of which are hereby incorporated by reference.

Thus, there is a continuing need to provide an improved cover assembly for an electrical box that provides simple and ready access to utility interfaces within the poke through, while preventing unwanted fluid and debris from damaging the electrical junction box or utility interfaces.

SUMMARY OF THE INVENTION

Accordingly, it is a primary object of the embodiments of the invention to provide a cover assembly for an electrical box, such as a fire-rated poke through, utilizing enlarged links to achieve a 180 degree rotation of the cover, gasketed side doors, and a camming action latch assembly that utilizes a user's force to overcome a spring bias of the latch assembly for unlocking and opening the cover.

A further object of the embodiments of the invention is to provide a dual axis hinge assembly securing a cover to a frame to prevent damage to the cover while facilitating 180 degree rotation and a substantially flat open position.

Another object of the embodiments of the invention is to provide user access to a junction box and utility interface within the electrical box without opening the cover.

Another object of the embodiments of the invention is to seal the cover and side doors of the cover assembly to prevent unwanted fluid and debris from contacting and damaging the utility interface and junction box within the electrical box.

The foregoing objectives are basically attained by a cover assembly for an electrical box, including a frame defining an opening, said frame including a first frame location and a second frame location, said first frame location being substantially opposite said second frame location; a cover movable between a closed position over said opening and an open position away from said opening, said cover having a perimeter including a proximal end and a distal end, said proximal end being substantially opposite said distal end; and a hinge attaching said cover to said rear frame portion, said hinge having two substantially parallel pivot axes, at least one of which is movable towards and away from the other, one pivot axis located at said first frame location and the other pivot axis located at said proximal end of said cover.

The foregoing objectives are further obtained by a cover assembly for an electrical box, including a frame defining an opening, said frame location including a first frame location and a second frame location, said first frame portion being substantially opposite said second frame location; a cover movable between a closed position over said opening and an open position away from said opening, said cover having a perimeter including a proximal end and a distal end, said proximal end being substantially opposite said distal end said second frame location including a protrusion; a hinge pivotally attaching said cover to said first frame location; and a latch slideably coupled to said cover and adapted to releasably engage said protrusion on said second frame location, wherein said latch extends below said protrusion in a locked position and above said protrusion in an unlocked position.

The foregoing objectives are also obtained by a cover assembly for an electrical box including a frame defining an opening, said frame including a first frame location and a second frame location, said first frame location being substantially opposite said second frame location; a cover movable between a closed position over said opening and an open position away from said opening, said cover having a perimeter including a proximal end and a distal end, said proximal end being substantially opposite said distal end; a hinge pivotally attaching said cover to said first frame location; a door pivotally coupled to said cover providing access to said opening defined by said frame; and a weatherproof barrier coupled to one of said door and said cover.

Other objects, advantages and salient features of the embodiments of the invention will become apparent from the following detailed description, which, taken in conjunction with the annexed drawings, discloses a preferred embodiment of the invention.

BRIEF DESCRIPTION OF THE DRAWINGS

The above benefits and other advantages of the various embodiments of the present invention will be more apparent from the following detailed description of an exemplary embodiment of the present invention and from the accompanying drawing figures, in which.

DETAILED DESCRIPTION OF THE EXEMPLARY EMBODIMENT

Figure 1:
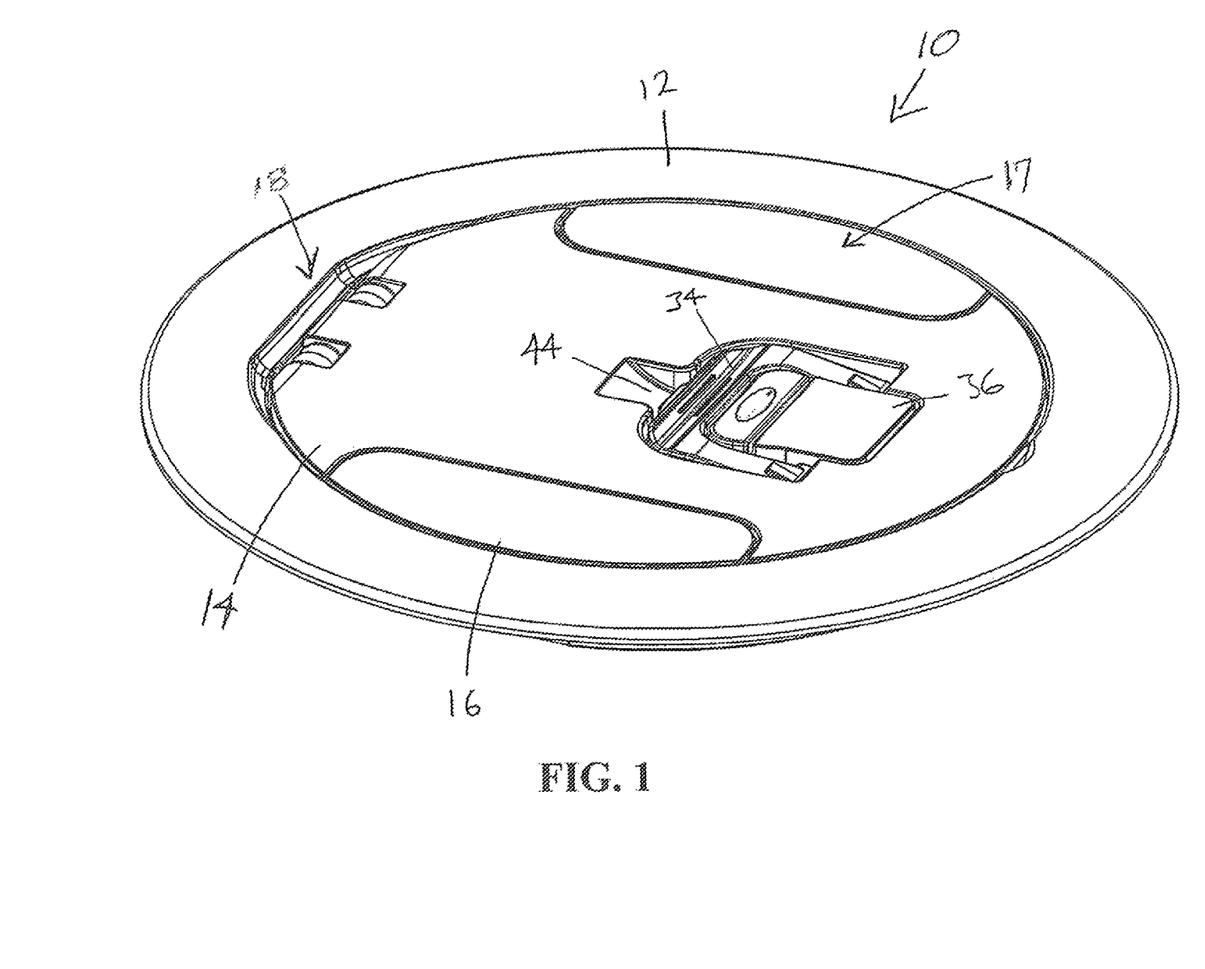
FIG. 1 is a top perspective view of a cover assembly in a closed position according to an exemplary embodiment of the present invention.
Figure 2:
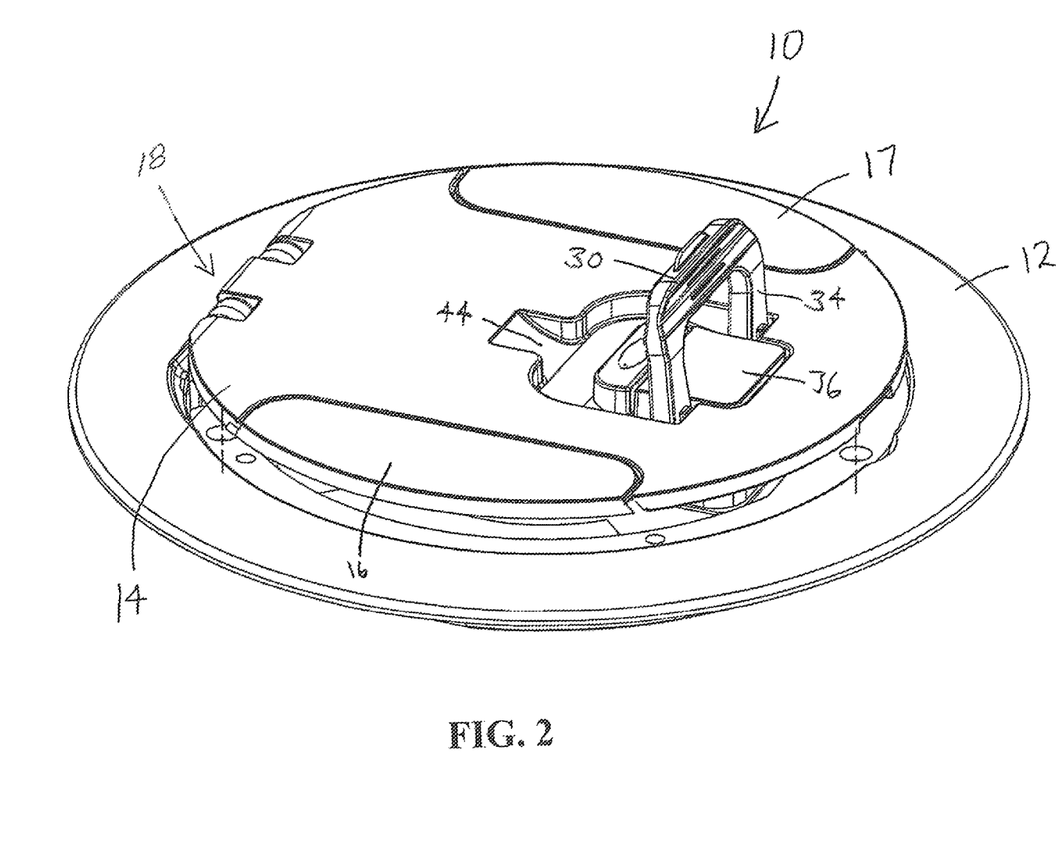
FIG. 2 is a top perspective view of the cover assembly of FIG. 1 in a partially opened position.

As shown in FIGS. 1-11, a cover assembly 10 in accordance with an embodiment of the invention includes a frame 12, a cover 14, first and second door assemblies 16 and 17, a hinge assembly 18, and first and second latch assemblies 20 and 21. The frame 12 defines a substantially circular opening that can be covered by the cover 14. The cover 14 is pivotally secured to the frame 12 via hinge assembly 18. The hinge assembly 18 includes first and second pivot axes that facilitate 180 degree rotation of the cover 14 with respect to the frame 12 and a substantially flat orientation when open. The first and second door assemblies 16 and 17 are pivotally secured to the cover 14 via corresponding hinges and provide electrical wire egress with the cover closed. The cover 14 can be locked in a closed position, as shown in FIG. 1, via the first and second latch assemblies 20 and 21 by merely pushing downwardly on the cover; the cover can be easily opened by merely pulling it upwardly without the need for tools.

The frame 12 defines a substantially circular opening and includes a substantially planar flange 24 extending in a radial direction from the opening. The flange 24 supports the cover 14 and suitably attached electrical box, such as fire-rated poke through 25, and junction box 26 when installed in a floor, wall or ceiling. The cover 14 seals the frame 12 opening when in the closed position via a frame gasket 27 secured to an inner surface 28 of the frame 12. The frame gasket 27 can be secured to the inner surface 28 of the frame 12 by fasteners 30-32 or alternatively, by an adhesive or other fastening device.

While shown as a fire-rated poke through with recessed outlets, other embodiments of the invention can be used in other types of electrical boxes, and can be received in raised access and concrete floors without fire-rated features, as well as in walls and ceilings of a building.

The cover 14 includes a substantially U-shaped handle 34 that allows the fingers of a user to grip and lift the cover 14 open from the frame 12. The handle 34 is pivotally secured to the cover 14 via a handle retainer 36 that is fastened to the cover 14 via bolts 38-41 or other desired fasteners. The handle 34 rests in a recess 44 in the cover 14, enabling the handle 30 to lie substantially flush with the top surface of the cover 14. Being a fire safety device, an intumescent puck 46 is advantageously secured underneath the cover 14 by a retaining plate 48 and a fastener 50. The intumescent puck 46 is sized and shaped to optimize the overall fire and heat protection of the fire-rated poke through 25, while maintaining accessibility to the junction box 26 or other desired utility interface with the electrical components therein.

The two first and second egress door assemblies 16 and 17 are secured on opposing sides of the cover 14 and are substantially flush with the top surface of the cover 14 in their closed positions. The door assemblies 16 and 17 are secured to the cover 14 via corresponding hinges 52 and 54. Hinges 52 and 54 are fastened directly to the underside of the cover 14 via corresponding hinge retaining assemblies 56 and 58. Hinges 52 and 54 enable door assemblies 16 and 17 to pivot inwardly below the cover 14, providing readily available access to electrical cables receivable in electrical outlets in the poke through that are electrical connected to the junction box 26 or other desired utility interface.

Figure 5:
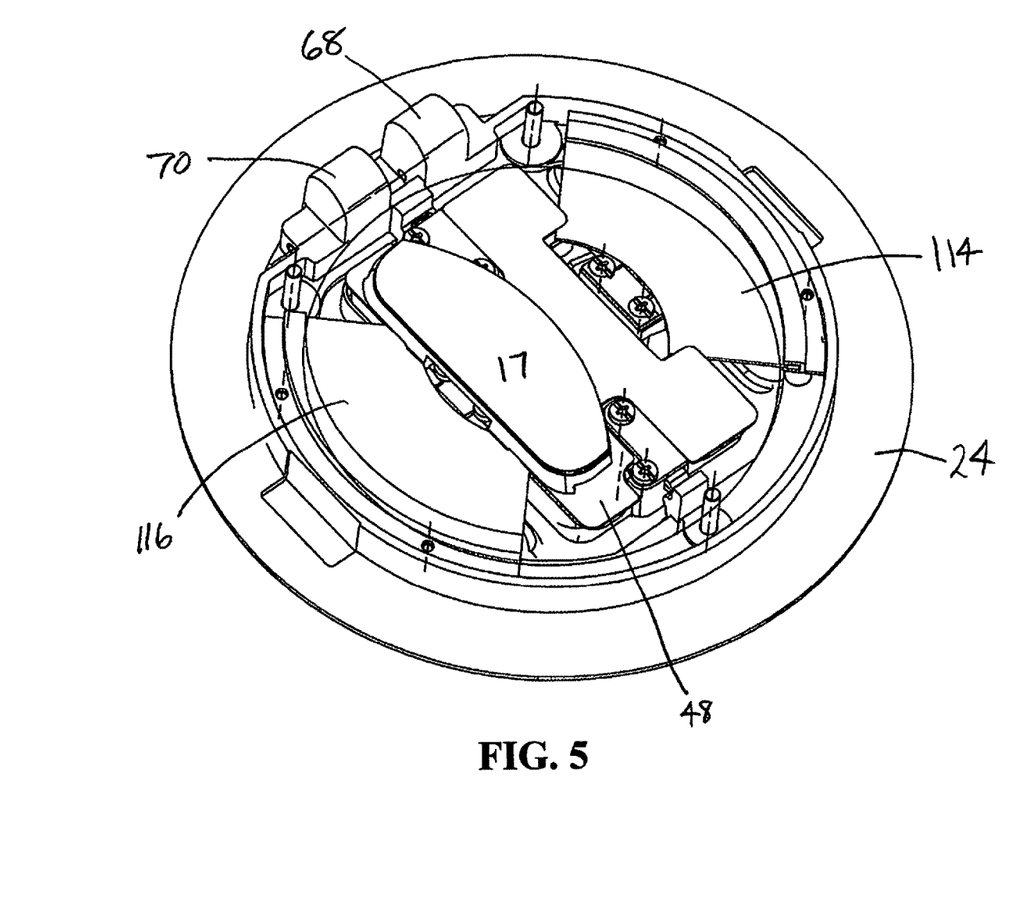
FIG. 5 is a bottom perspective view of the cover assembly of FIG. 1 having a first door in an open position.
Figure 6:
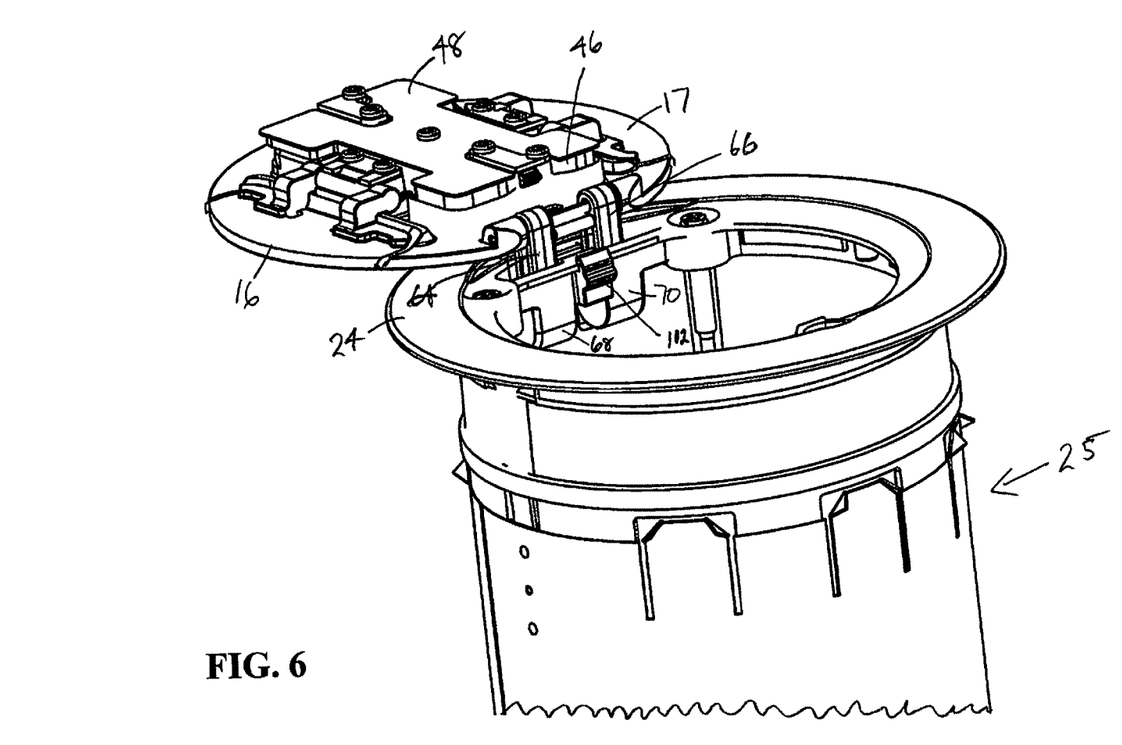
FIG. 6 is a top perspective view of the cover assembly of FIG. 1 secured to a fire-rated poke through and in a fully opened position.

As shown in FIG. 5, the door assemblies 16 and 17 can pivot substantially 180 degrees with respect to the cover 14. The door assemblies 16 and 17 pivot inwardly to provide access openings in the cover 14, so electrical and power cables from equipment can remain plugged into the junction box 26 or other utility interface, while the cover 14 can remain closed for aesthetic and safety reasons. Having the door assemblies 16 and 17 pivot inwardly preserves a substantially planar top surface of the cover 14, preventing a potential tripping hazard.

Hinges 52 and 54 can hold the respective doors 16 and 17 in any desired pivoted position with respect to the cover 14, via friction interference, including include the substantially flush position with the top surface of the cover 14. In the flush position with the top surface of the cover 14, the door assemblies 16 and 17 also seal the opening in the frame 12 by engagement with the frame gasket 27 and corresponding door gaskets 60 and 62. Door gaskets 60 and 62, or both barriers such as brushes, can be secured to corresponding door assemblies 16 and 17 by an adhesive or another desired fastening element. Frame gasket 27 and door gaskets 60 and 62 prevent unwanted liquid and debris from penetrating the cover 12 and damaging the junction box 26 or other utility interface.

To further protect the junction box 26 and other utility interfaces within the poke through 25, a pair of weather strips 114 and 116 are secured to an underside of the frame 12. The weather strips 114 and 116 are sized to substantially match the footprint of the doors 16 and 17 and thus provide an additional protective bather when the doors 16 and 17 are in an open position. The weather strips 114 and 116 can be formed of rubber, plastic, or other desired material or can alternatively be formed out of bristles that can also act as a protective barrier.

Figure 7:
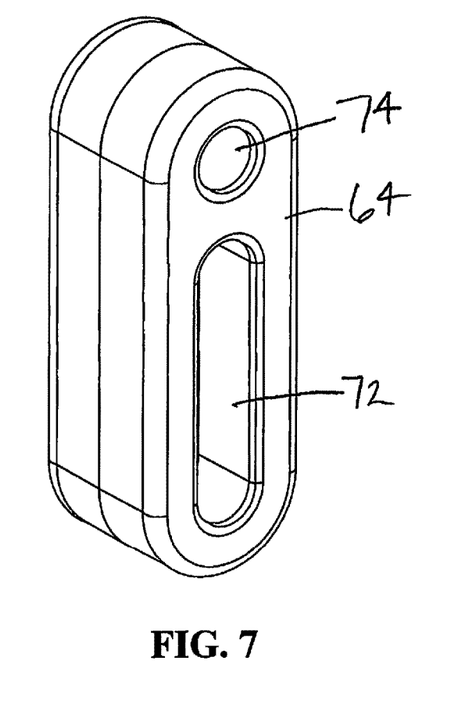
FIG. 7 is an enlarged perspective view of an enlarged link of the cover assembly of FIG. 1.

The cover 14 is pivotable to a substantially full 180 degree open position relative to the frame 12 by virtue of the hinge assembly 18. The hinge assembly 18 includes enlarged links 64 and 66 that are housed vertically within corresponding hinge sockets 68 and 70 formed integrally with the frame 12. Enlarged link 64, as shown in FIG. 7, includes an elongated through slot 72 that extends longitudinally along the link 64. The enlarged link 64 also includes a bushing or through hole 74 located near a terminating end of the link 64. Enlarged link 66 also includes a similar elongated through slot 76 and bushing 78.

Figure 8:
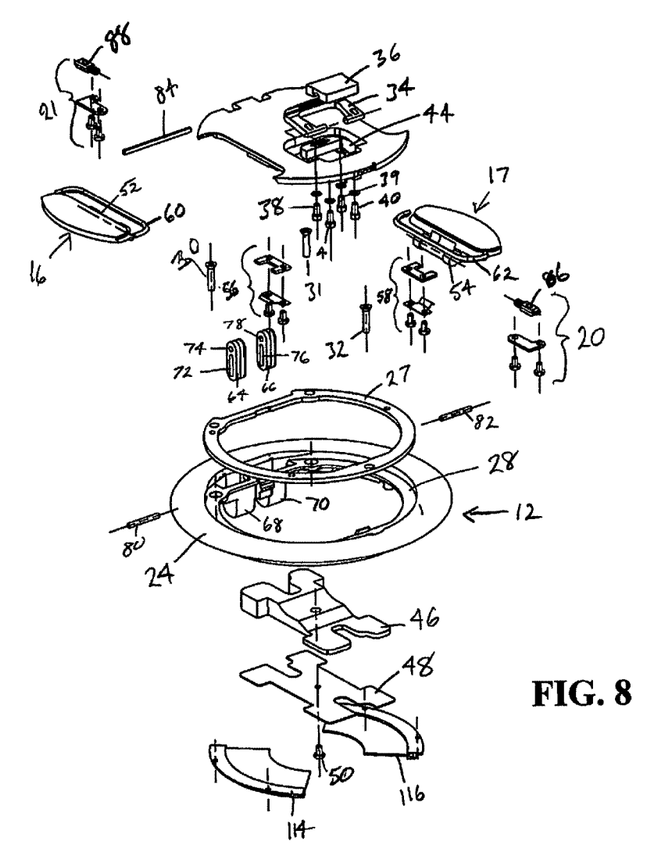
FIG. 8 is an exploded view of the components of the cover assembly of FIG. 1.
Figure 9:
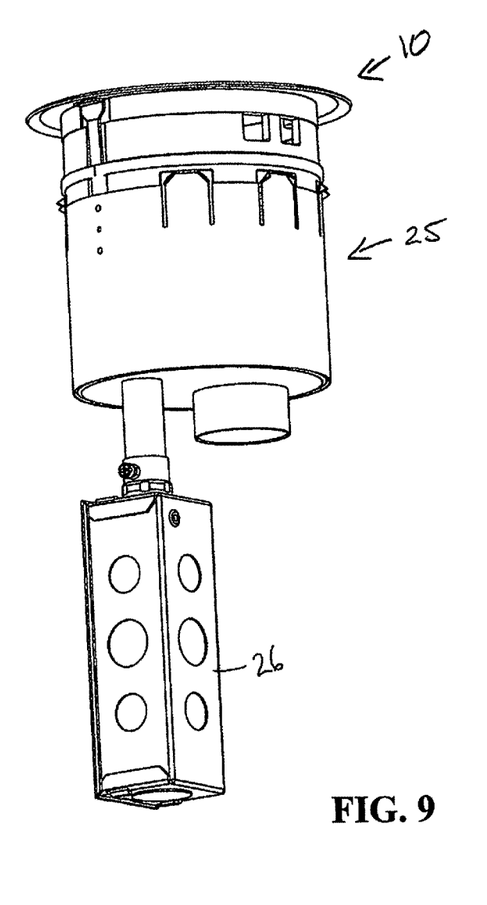
FIG. 9 is side perspective view of the cover assembly of FIG. 1 secured to a fire-rated poke through and junction box and in a closed position.

The enlarged links 64 and 66 are secured within the corresponding hinge sockets 68 and 70 via corresponding frame pins 80 and 82, shown in FIG. 8, that pass through corresponding slots 72 and 76. Although the frame pins 80 and 82 are fixed within the corresponding hinge sockets 68 and 70, the enlarged links are moveable with respect to the frame pins 80 and 82 due to their travel within the corresponding elongated slots 72 and 76.

The enlarged links 64 and 66 are fixed to a proximal or fixed end of the cover 14 via a single cover pin 84 that passes through bushings 74 and 78 of the enlarged links 64 and 66. The bushings 74 and 78 are sized to provide slipping engagement between the enlarged links 64 and 66, and the cover pin 84. Therefore, the enlarged links 64 and 66 can pivot about the cover pin 84, but cannot otherwise move or translate with respect to the enlarged links 64 and 66.

The cover 14 is locked in a closed position with respect to the frame 12 by latch assemblies 20 and 21. Latch assembly 20 is located on an underside of the cover at the distal or free end. Latch assembly 21 is located substantially opposed to the latch assembly 20 and is also located on an underside of the cover 14, but at the proximal or fixed end. The latch assemblies 20 and 21 include corresponding slide bars 86 and 88. The slide bars 86 and 88 include substantially rounded end portions 90 and 92 and opposing, substantially cylindrical end portions 94 and 96. Between the rounded end portions 90 and 92 and the cylindrical end portions 94 and 96 are guide slots 98 and 100. The guide slots 98 and 100 are sized to slideably engage corresponding bar guides 102 and 104 formed on the underside of the cover 14. The bar guides 102 and 104 facilitate the radial movement of the slide bars 86 and 88 with respect to the cover 14, while preventing sideways movement.

The latch assemblies 20 and 21 also include corresponding helical springs 106 and 108 that engage the corresponding cylindrical end portions 94 and 96 of the slide bars 86 and 88. The springs 106 and 108 abut the cover 14 and bias the slide bars 86 and 88 radially outward toward the frame 12. The frame 12 includes rounded latch protrusions 110 and 112 that extend radially inward. When the cover 14 is in the locked position, the rounded end portions 90 and 92 of the slide bars 86 and 88 are biased below the corresponding latch protrusions 110 and 112, which prevents the cover 14 from opening without an external force pulling up on the cover 14 sufficient enough to overcome the bias of the springs 106 and 108 and enabling the slide bars 86 and 88 to pass by the corresponding latch protrusions 110 and 112. Further details of the cover opening and closing operation are disclosed below.

Operation

Figure 10:
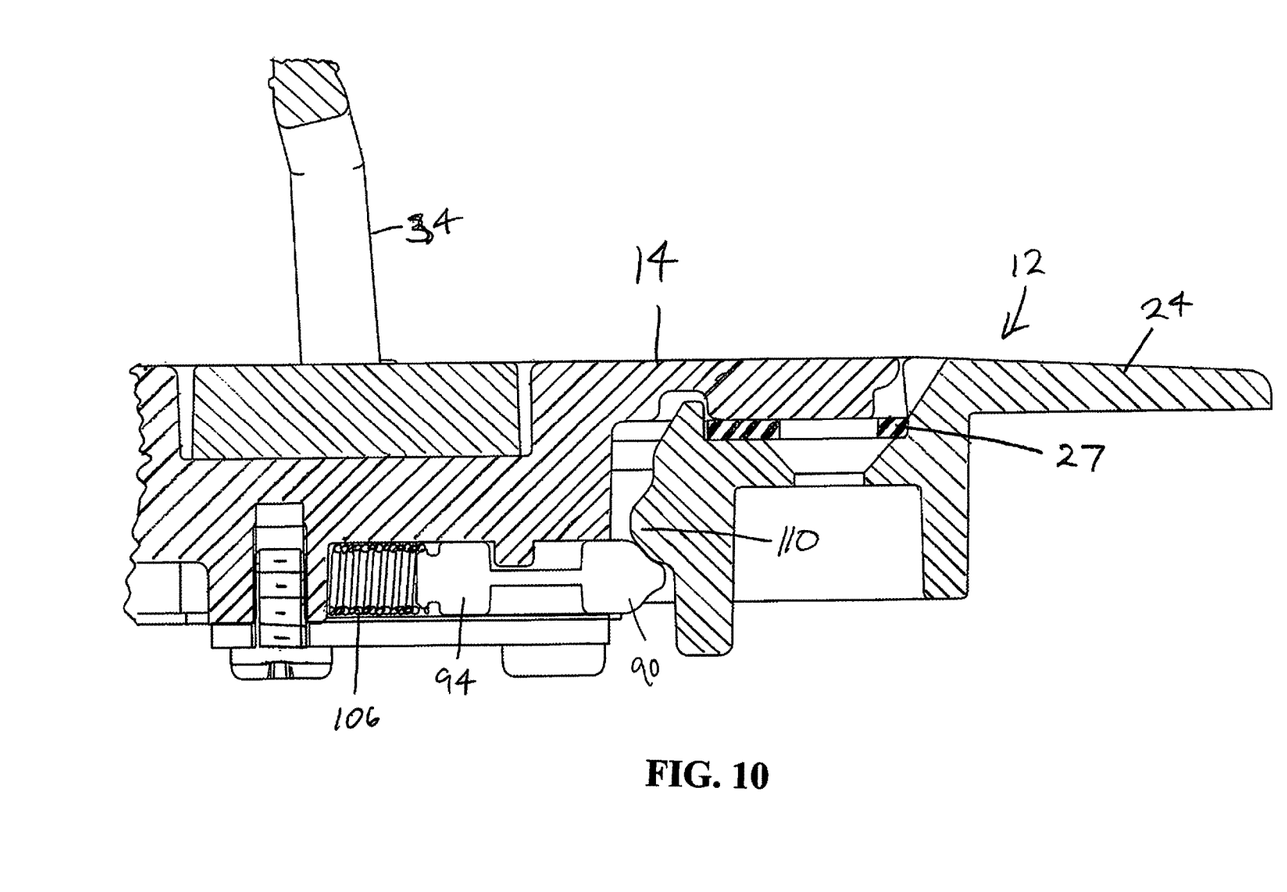
FIG. 10 is an enlarged cross-sectional view in side elevation of the cover assembly of FIG. 1 in a closed position having a locked latch assembly.
Figure 11:
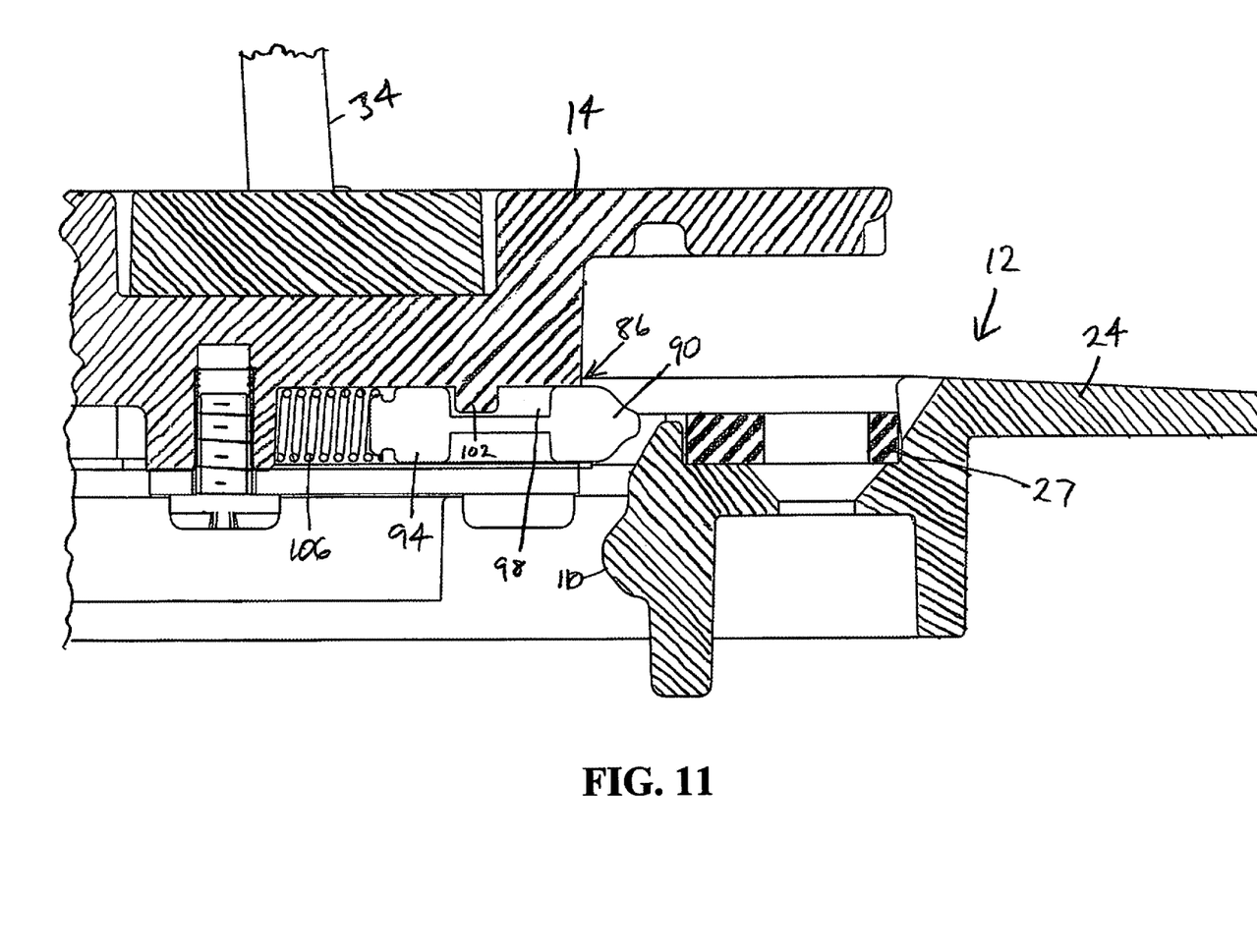
FIG. 11 is an enlarged cross-sectional view in side elevation of the cover assembly of FIG. 1 in a partially open position having a disengaged latch assembly.

FIGS. 10 and 11 illustrate the opening and unlocking of the cover 14 from the frame 12. As shown in FIG. 10, in a closed position the top surface of the cover 14 is substantially flush with the top surface of the flange 24 of the frame 12. The slide bar 20 is in a fully radially extended position with the rounded end portion 90 in direct contact with the underside of the latch protrusion 110. The latch protrusion 110 prevents the cover 14 from opening and the rounded end portion 90 of the slide bar 86 from passing above the latch protrusion 110 without an external force pulling up on the cover 14 sufficient enough to overcome the bias of the spring 106. The locking dynamics of the closed cover 14 are similar for corresponding slide bar 88 and latch protrusion 112, although not shown in the figures.

To open the cover 14, a user pulls the handle 34 with enough force to overcome the bias of the springs 106 and 108. As the cover 14 is opened, as shown in FIGS. 3 and 11, the slide bars 86 and 88 retract radially enough to pass the rounded end portions 90 and 92 of the slide bars 86 and 88 past the corresponding latch protrusions 110 and 112.

As the rounded end portion 92 of slide bar 88 overcomes the latch protrusion 112, the enlarged links 64 and 65 rise vertically with the cover 14, away from the frame 12. The vertical movement of the enlarged links 64 and 65 is accomplished because the bushings 74 and 78 are fixed to the cover via the cover pin 84. However, the enlarged links 64 and 66 remain secured to the frame 12 via slideable engagement between the elongated slots 72 and 76 and the frame pins 80 and 82. Thus the hinge assembly 18 provides two substantially parallel pivoting axes between the cover 14 and the frame 12.

Figure 3:
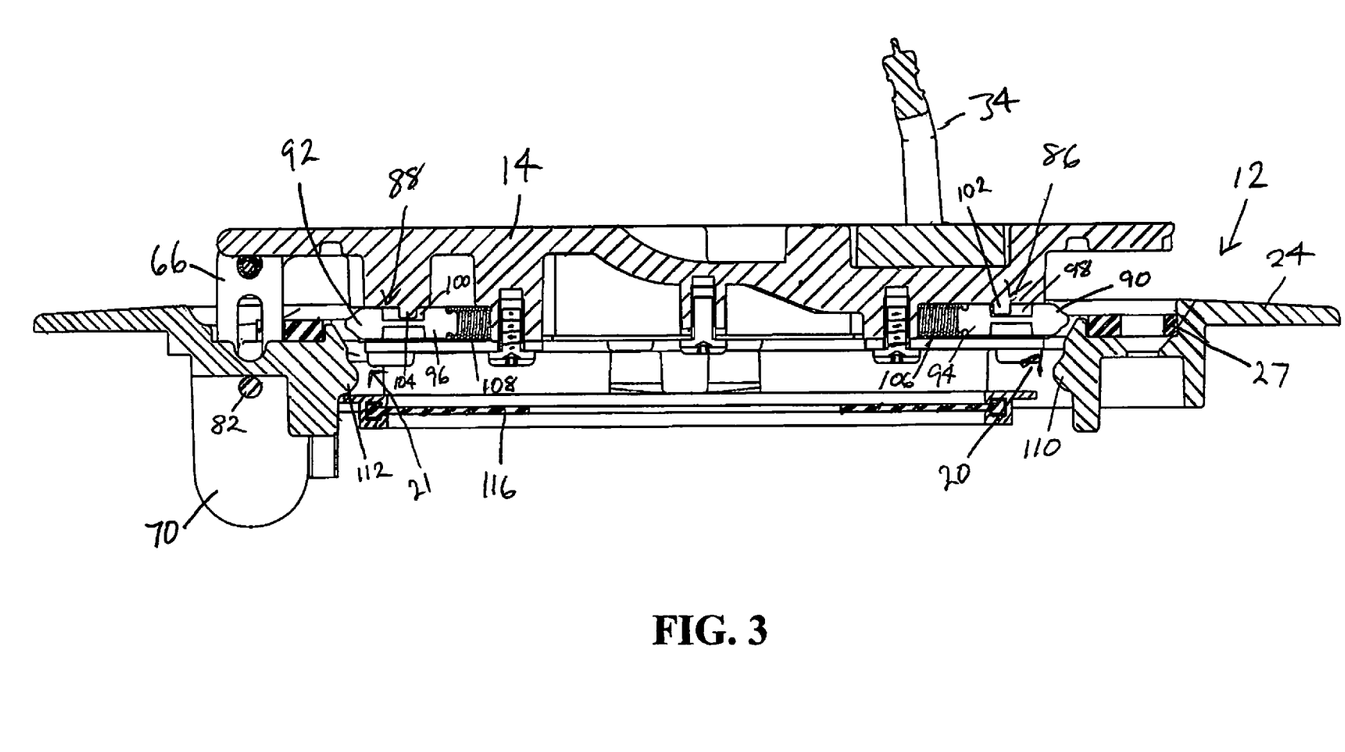
FIG. 3 is a cross-sectional view in side elevation of the cover assembly of FIG. 1 in a partially opened position.
Figure 4:
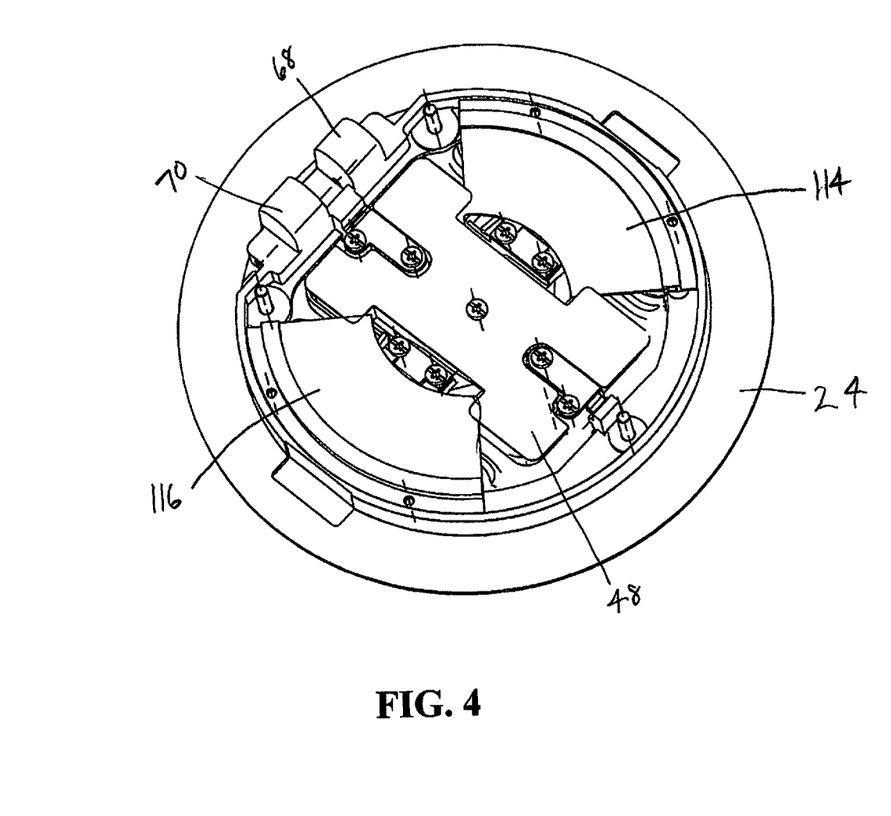
FIG. 4 is bottom perspective view of the cover assembly of FIG. 1 in a closed position.

A first pivoting axis created by the combination of both frame pins 80 and 82, enables the entire cover 14 to translate vertically above the frame 12, as shown in FIG. 3. This enables the cover 14 to pivot a full 180 about the second pivoting axis created by the cover pin 84 without being obstructed by contact with the frame 12. Additionally, the cover 14 is translationally fixed with respect to the enlarged links 64 and 66 due to the engagement between the cover pin 84 and the bushings 74 and 78, thereby enabling consistent and smooth pivoting of the cover 14 with respect to the enlarged links 64 and 66. The consistent and smooth pivoting reduces potential damage to the cover 14 if the cover is opened very quickly or with significant force and allows the cover 14 to lie substantially flat in the open position to reduce tripping hazards.

When the cover is in the open position the door assemblies 16 and 17 can pivot substantially 180 degrees with respect to the cover 14. The door assemblies 16 and 17 pivot inwardly to provide access openings in the cover 14, so electrical and power cables from equipment can remain plugged into the junction box 26 or other utility interface.

Hinges 52 and 54 hold the respective doors 16 and 17 in any desired pivoted position with respect to the cover 14, via friction interference, including both a fully opened position beneath and substantially parallel to the cover 14 and the substantially flush position with the top surface of the cover 14.

To close the cover 14 after use, a user presses the cover with sufficient force to once again permit the rounded end portions 90 and 92 of the slide bars 86 and 88 to overcome the spring biases of the springs 106 and 108 and then pass beneath the corresponding latch protrusions 110 and 112. The cover 14 is locked in the closed position when the rounded end portions 90 and 92 of the slide bars 86 and 88 snap back to a radially extended position beneath the corresponding latch protrusions 110 and 112.

While an advantageous embodiment has been chosen to illustrate the invention, it will be understood by those skilled in the art that various changes and modifications may be made therein without departing from the scope of the invention as defined in the appended claims.

The foregoing embodiments and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims.

What is claimed is:

1. A cover assembly for an electrical box comprising:
a frame defining an opening, said frame including a first frame location and a second frame location, said first frame location being substantially opposite said second frame location, said frame having a hinge socket at said first frame location;
a cover received in said opening of said frame where an outer face of said cover is substantially flush with an outer face of said frame in a closed position, said cover being movable between said closed position within said opening and an open position away from said opening, said cover having a perimeter including a proximal end and a distal end, said proximal end being substantially opposite said distal end; and
a hinge attaching said cover to said first frame location, said hinge having a hinge link with a first end pivotally coupled to said cover about a first pivot axis and a second end coupled to said hinge socket of said frame, said second end of said hinge link having an elongated slot receiving a connecting pin coupled to said hinge socket of said frame whereby said hinge link is slideable within said hinge socket with respect to said frame from a first retracted position where said cover is not pivotable with respect to said hinge link to a second extended position in a substantially outward direction from said opening in said frame and said cover is spaced from said frame, and where said cover is pivotable about 180° with respect to said first end of said hinge when said hinge link is in the second extended position.

2. The cover assembly of claim 1, and further comprising
a door pivotally coupled to said cover providing access to said opening defined by said frame; and
a door gasket coupled to one of said door and said cover.

3. A cover assembly for an electrical box comprising:
a frame defining an opening, said frame including a first frame location having a first inwardly extending protrusion and a second frame location having a second inwardly extending protrusion, said first frame location being substantially opposite said second frame location;
a cover received in said opening of said frame where an outer face of said cover is substantially flush with an outer face of said frame in a closed position, said cover being movable between said closed position within said opening and an open position away from said opening, said cover having a perimeter including a proximal end and a distal end, said proximal end being substantially opposite said distal end;
a hinge pivotally attaching said cover to said first frame location, said hinge having a first hinge link and a second hinge link, each hinge link having a first end pivotally coupled to said cover to enable said cover to pivot with respect to said hinge link and said frame, and a second end slideably received in and coupled to a respective hinge socket in said opening in said frame to move said cover from a first retracted position to a second extended position away from said frame in a substantially linear direction, each said hinge socket permitting sliding of said hinge link in the linear direction and preventing pivoting of said cover with respect to said hinge link when said hinge link is in said first retracted position;
a first latch slideably coupled to said cover and adapted to releasably engage said first protrusion by an upward movement of said cover relative to said frame;
a second latch slideably coupled to said cover at said distal end and adapted to releasably engage said second protrusion on said second frame location by an upward movement of said cover relative to said frame, wherein said first latch and second latch extend below said respective protrusion in a locked position and above said respective protrusion in an unlocked position;
said first latch being spring biased radially outwardly in a first direction, and said second latch being spring biased radially outwardly in a second direction opposite said first direction,
each said first latch and second latch having an inclined top face and an inclined bottom face, and
each said protrusion having an inclined top face cooperating with said bottom face of the respective latch enabling said latch to slide over the protrusion by applying a downward force on said cover to said closed position, and having an inclined bottom face cooperating with said top face of the respective latch enabling said latch to slide over the protrusion by applying an upward force on said cover to move said cover outwardly from said frame and slide each hinge link upward to a second position to enable said cover to pivot with respect to said hinge link.

4. A cover assembly for an electrical box comprising:
a frame defining an opening, said frame including an outer face, a first frame location and a second frame location, said first frame location being substantially opposite said second frame location;
a cover received in said opening where an outer face of said cover is substantially flush with said outer face of said frame in a closed position, said cover being movable between the closed position received in said opening, and an open position away from said opening, said cover having a perimeter including a proximal end and a distal end, said proximal end being substantially opposite said distal end;
a first hinge link and a second hinge link, each said hinge link having a first end pivotally attaching said cover to enable said cover to pivot about 180° relative to said frame and hinge link and a second end coupled to and slideable within a respective hinge socket at said first frame location, said second end having an elongated slot receiving a connecting pin coupled to said respective hinge socket, said hinge socket preventing pivoting of said hinge link with respect to said frame, each said hinge link being slideable with respect to said connecting pin within said hinge socket from a first retracted position where said outer face of said cover is flush with said outer face of said frame to a second extended position where said cover is spaced upwardly with respect to said frame, wherein said cover is not able to pivot when said cover is in the first closed position and is able to pivot when said cover is in said second position;

a door pivotally coupled to said cover providing access to said opening defined by said frame.

5. The cover assembly of claim 4, and further comprising
a first protrusion located on said first frame location, and
a first latch slideably coupled to said cover and spring biased to releasably engage said first protrusion on said first frame location, wherein said first latch extends below said first protrusion in a locked position and above said protrusion in an unlocked position.

6. The cover assembly of claim 5 further comprising
a second protrusion located on said second frame location; and
a second latch slideably coupled to said cover and spring biased to releasably engage said second protrusion on said second frame location, wherein said second latch extends below said second protrusion in a locked position and above said protrusion in an unlocked position.

7. The cover assembly of claim 3, wherein
said cover is movable away from said frame by applying an upward force to disengage said first latch from said first protrusion and to disengage said second latch from said second protrusion.

8. The cover assembly of claim 7, wherein
said cover is able to pivot about 180° with respect to said frame when said first latch and second latch disengage from the respective protrusion.

9. The cover assembly of claim 8, wherein
said cover pivots about a first axis at said first end of said hinge link; and
said second end includes an elongated slot receiving a pin coupled to said frame enabling said second end of said hinge link and cover to slide outwardly with respect to said frame to disengage said first latch and second latch from said respective protrusions.

10. The cover assembly of claim 4, wherein
said cover is movable in a linear direction between a first position received in said opening of said frame and a second position spaced from said outer face, and where said cover is pivotable about a pivot axis at said first end of said link when said cover is in said second position.

11. The cover assembly of claim 1, wherein said cover further comprises
a first spring biased latch at said proximal end of said cover for latching with an inwardly extending detent on said frame at said first frame location,
a second spring biased latch at said distal end of said cover for latching with an inwardly extending detent on said frame at said second frame location, and
where said cover is opened by lifting upward on said cover to release said first latch and second latch from said frame, and slide said hinge link to the second position to enable said cover to pivot with respect to said first end of said hinge link.

* * * * *